Aug. 8, 1933.   E. E. LINDSEY   1,921,235
RECIPROCATING MOVEMENT
Filed Oct. 28, 1932
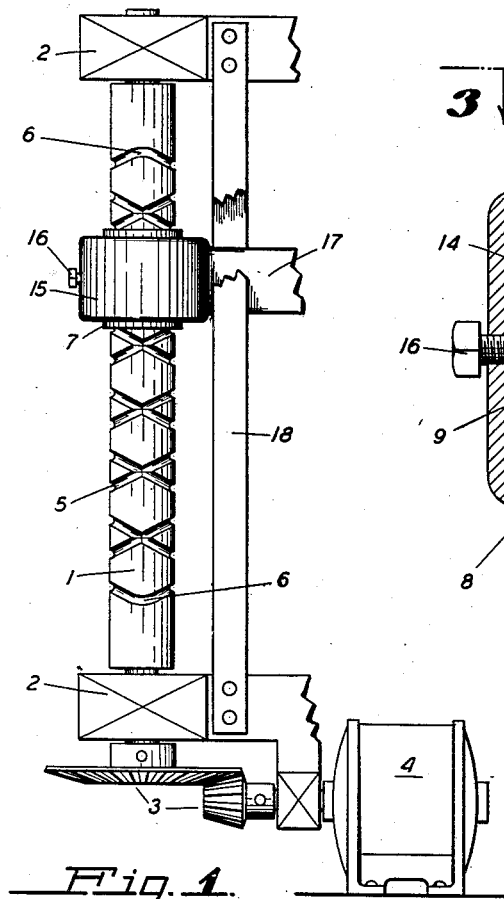
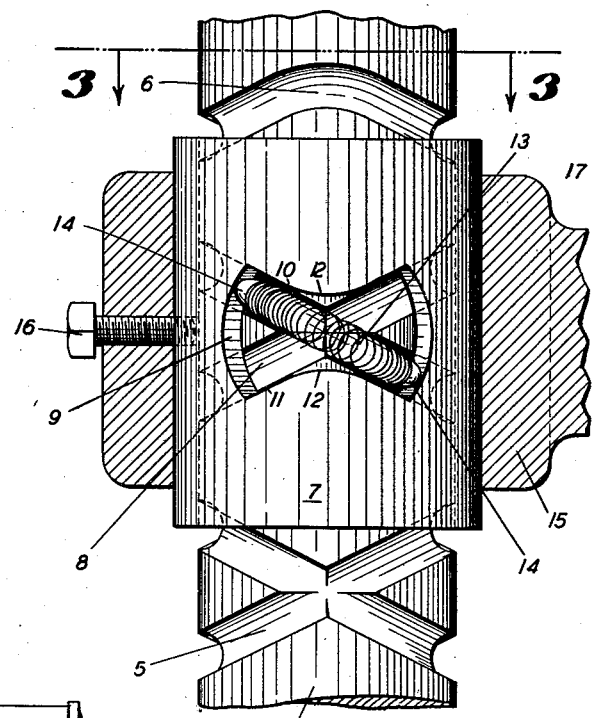
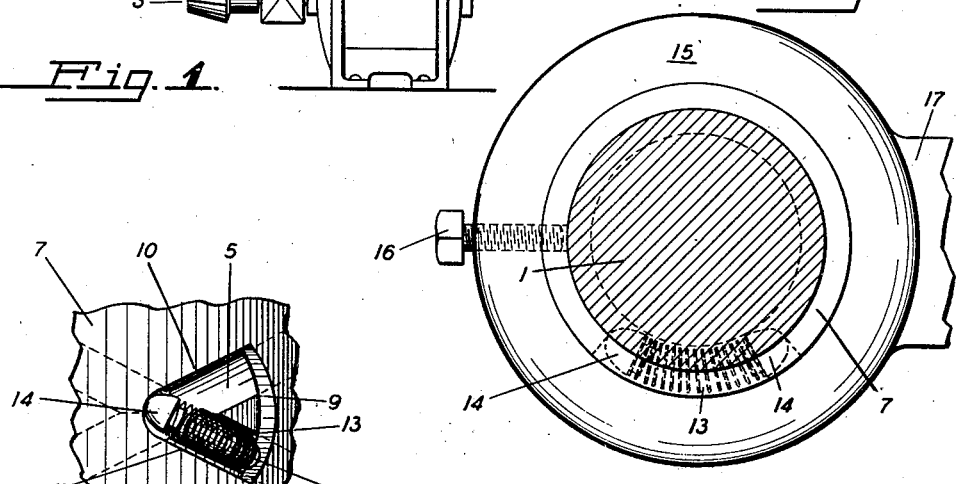
INVENTOR,
ERNEST E. LINDSEY.
BY
ATTORNEY Patented Aug. 8, 1933

1,921,235

UNITED STATES PATENT OFFICE 1,921,235

RECIPROCATING MOVEMENT

Ernest E. Lindsey, San Francisco, Calif.

Application October 28, 1932. Serial No. 639,943

15 Claims. (Cl. 74—14)

My invention relates to a device for translating a rotary movement into a reciprocating movement and more particularly to such a device utilizing a double reversed thread.

Among the advantages of my invention are: To provide a simple and efficient reciprocating movement; to provide a simple means of transferring power from a rotating shaft to a non-rotating reciprocating member; and to provide a flexible drive unit for transmitting power from a rotating double reversed thread to a reciprocating member.

Other objects of my invention will be apparent or will be specifically pointed out in the description forming a part of this specification, but I do not limit myself to the embodiment of my invention herein described, as various forms may be adopted within the scope of the claims.

Referring to the drawing:

Figure 1 is an elevation of a mechanical movement embodying my invention,

Figure 2 is a side view, partly in elevation and partly in section of the drive portion of Figure 1.

Figure 3 is a sectional view taken in a plane indicated by the line 3—3 in Figure 1.

Figure 4 is a side view of a modified aperture.

In reciprocating movements obtained from a rotating shaft utilizing a double reversed, interconnected thread, much difficulty has arisen in obtaining a smooth even transfer of power from the rotating shaft to the reciprocating member, as where the threads cross, large open spaces occur, and the drive member must span these spaces. If this drive member is made long enough to span these gaps, it cannot easily pass around the angle formed at the junction of the two threads at their ends, and the common practice has been to make the link a very loose fit in the threads to allow the link to pass the angle. This looseness gives rise to a jerk or backlash take-up, whenever the drive member passes a thread crossing, and the reciprocating motion is a series of jerks. I have found that a flexible drive member will cross the junctions without a jerk, will pass the angle smoothly, and can be tightly fitted to the threads.

In the drawing, which illustrates a preferred form of my invention, a shaft 1 is supported by bearings 2—2 and rotated through bevel gears 3 by a motor 4.

The shaft is cut with a double reversed thread 5, preferably of half round section meeting to form end angles 6—6. Slidably mounted on the shaft is a reciprocating sleeve having cut therein an aperture 8 of "hour-glass" shape, shown in Figure 3. This aperture has convexly arcuate ends 9, concave top 10, and concave bottom 11. The top and bottom sides however are not circular but are angular, with the points 12 of the angle rounded off. The pitch of the wall of top and bottom adjacent the corners, should closely approximate the pitch of the thread, as shown.

Inserted in the aperture is a flexible drive assembly which comprises a compression spring 13, of circular section, fitting the thread, having a pair of torpedo shaped bearing heads 14—14 at each end. This spring is well compressed before insertion, and after being placed in the aperture, and engaged in the thread, is held in the aperture and in the thread by a power sleeve 15 which is slipped over the bearing sleeve and held in place by set screw 16. The spring pressure then forces the ends of the drive member against the arcuate ends.

In modification shown the sleeve 7 is made just thick enough to allow the spring to be firmly held in the threads.

The power sleeve 15 is provided with an arm 17 which may be used to transmit the reciprocating motion toward a desired use. Passing through this arm is a slide 18, attached top and bottom to the bearings 2, effectually preventing the reciprocating sleeve from rotating.

In operation the forward bearing head and the fore part of the spring bears against the thread and the angular sides on the top or bottom, in accordance with the direction. On crossing the gaps at the junction of the threads the bearing progresses back along the spring and the angular portion, until the leading head is far enough into the thread on the opposite side of the gap for the forward end to take the load again. There is no tendency for jerks or lost motion as the spring totally fills the thread and the bearing point will move away from the corner along the spring until the complete thread is again in operation, bearing on the forward end again.

When the sleeve reaches the connected angular ends of the thread, the leading bearing head progresses around the angle, changes from one corner to the other, until in the middle of the angle both heads are either in the upper, or lower corners as the case may be. Further rotation brings the rear head up to the diametric corner again and the sleeve reverses its direction smoothly and without hesitation.

The arcs on the ends of the aperture are preferably so designed that at all positions, the spring will have substantially the same length. It will be noted that the bearings, both up and down, will be on the same end of the aperture for a given direction of rotation.

The resultant reciprocating movement is smooth, free from jerks and back lash, and, due to the roller type of frictional bearing given by the spring, is efficient in its transfer of power. The drive has many uses, one of which, for example, is in the construction of deep well pumps, for oil, or water. Other uses too innumerable to list here, will be apparent to those skilled in the art.

In the modified form illustrated in Figure 4, a triangular aperture is shown, with the drive member pivoting from one end instead of in the middle as in Figure 3. Other shapes may be used, within the scope of the invention. In all cases, however, the operation is the same. The spring readily passes around the angle at the end junction of the threads, and the arcuate end is long enough to enable the spring to reverse its angular position to follow the reversed thread.

I claim:

1. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, and a flexible drive member adapted to fit in and follow said threads, said drive member having a rounded end bearing on said arcuate end of said aperture.

2. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, and a flexible spring adapted to fit in and follow said threads, said spring having a rounded end bearing on said arcuate end of said aperture.

3. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, a flexible drive member adapted to fit in and follow said threads, and a pair of separate end bearings on said drive member contacting the ends of said aperture.

4. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, a flexible drive member adapted to fit in and follow said threads, said drive member having a rounded end bearing on said arcuate end, and means for maintaining said drive member within said aperture.

5. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, a flexible drive member adapted to transmit power from said shaft to said sleeve, said drive member having a diameter in excess of the depth of said thread, fitting in said thread, the ends of said drive member bearing against the ends of said aperture.

6. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, and a flexible drive member in said aperture fitting said threads and having a length greater than the free space at the intersection of said threads.

7. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, and a drive assembly in said aperture fitting said thread and having a length greater than the free space at the intersection of said threads, said drive member comprising two solid members separated by a flexible link.

8. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, and a drive assembly in said aperture fitting said thread and having a length greater than the free space at the intersection of said threads, said drive member comprising two solid members separated by a coil spring.

9. A cam follower for use in conjunction with a cam comprising a shaft adapted to be rotated, said shaft having a connected double reversed thread cut therein, said follower comprising a reciprocating sleeve slidably mounted on said shaft, and having an aperture therein, said aperture having angularly disposed sides and an arcuate end, means for preventing said sleeve from rotating, and a drive assembly in said aperture fitting said thread and having a length greater than the free space at the intersection of said threads, said drive member comprising two solid members separated by a coil spring under compression whereby said solid members are held in contact with the ends of said aperture.

10. A cam follower for use in conjunction with a cam comprising a shaft adapted to be rotated, said shaft having a connected double reversed thread cut therein, said follower comprising a reciprocating sleeve slidably mounted on said shaft, said sleeve having an aperture therein, means for preventing said sleeve from rotating, and a flexible drive member adapted to transmit power from said threads to said sleeve, inside said aperture, said flexible member being longer than the free space at the intersection of said threads.

11. A cam follower for use in conjunction with a cam comprising a shaft adapted to be rotated, said shaft having a connected double reversed thread cut therein, said follower comprising a reciprocating sleeve slidably mounted on said shaft, said sleeve having an aperture therein, means for preventing said sleeve from rotating, a flexible drive member adapted to transmit power from said threads to said sleeve, inside said aperture, said flexible member being longer than the free space at the intersection of said threads, and means for maintaining said flexible drive member within said aperture.

12. A cam follower for use in conjunction with a cam comprising a shaft adapted to be rotated, said shaft having a connected double reversed thread cut therein, said follower comprising a reciprocating sleeve slidably mounted on said shaft, said sleeve having an aperture therein, said aperture having angularly disposed sides and an arcuate end, the angle of said sides being substantially equal to the acute angle of the threads, means for preventing said sleeve from rotating, and a flexible drive member adapted to fit in and follow said threads, said drive member having a rounded end bearing on said arcuate end.

13. A cam follower for use in conjunction with a cam comprising a rotating element having a varying pitch thread cut therein, said follower comprising a member adapted to progress along said rotating element and having an aperture therein, means for guiding said member along a predetermined path, and a flexible drive link adapted to transmit power from said thread to said member inside said aperture, said flexible drive link fitting said thread and being free within said aperture to follow the changing pitch of said thread.

14. A cam follower for use in conjunction with a cam comprising a rotating thread having a variable pitch, said follower comprising a member adapted to progress in a path parallel to the progression of said thread, said member having an aperture therein, a flexible drive link having a length greater than the width of said thread disposed within said aperture, said link being fitted to said thread and free to follow the changing pitch of said thread, and means to retain said link in contact with said thread.

15. A cam follower for use in conjunction with a cam comprising a rotating thread having a variable pitch, said follower comprising a member adapted to progress in a path parallel to the progression of said thread, said member having an aperture therein, a spiral spring having a length greater than the width of said thread disposed within said aperture, said spring being fitted to said thread and free to follow the changing pitch of said thread, and means to retain said spring in contact with said thread.

ERNEST E. LINDSEY.